Nov. 18, 1969 I. L. EISNER 3,479,038

RADIAL PHONOGRAPH PICKUP ARM AND TURNTABLE COMBINATION USING AIR BEARINGS

Filed Oct. 4, 1967

INVENTOR.
IRA LEONARD EISNER

BY Robert Ames Norton

ATTORNEY

United States Patent Office 3,479,038
Patented Nov. 18, 1969

3,479,038

RADIAL PHONOGRAPH PICKUP ARM AND TURNTABLE COMBINATION USING AIR BEARINGS

Ira Leonard Eisner, 93 Woodridge Drive, Stamford, Conn. 06905

Continuation-in-part of application Ser. No. 510,162, Nov. 24, 1965. This application Oct. 4, 1967, Ser. No. 672,806
Int. Cl. G11b 3/10
U.S. Cl. 274—23 4 Claims

ABSTRACT OF THE DISCLOSURE

A radial phonograph pickup arm along which a carriage carrying the pickup head can slide or rotate about the longitudinal axis of the arm. Means are provided for introducing air or other gas through tiny perforations to maintain an air cushion between the carrage and the supporting arm, or supporting track, so that solid to solid contact between carriage and supporting track is prevented. The pickup arm is associated with a turntable or other means for producing relative movement between pickup arm and a record. The turntable may also be supported by an airbearing supplied from the same source as that for the arm.

Related applications

This application is a continuation-in-part of my prior application Ser. No. 510,162, filed Nov. 24, 1965, and now abandoned.

Background of the invention

Record players and record changers for the most part have an arm which swings in from a post off to one side of the turntable. Serious problems have arisen because the arm makes different angles with the record grooves at different places on the record. The problem has been mitigated slightly by having specially curved arms but it has not been removed. If the stylus is tracking perfectly uniformly in the middle of the record it will be plowing against one side or other of the grooves at the beginning and at the end of the record. This causes increased wear on the records and stylus and also sometimes interferes with perfect reproduction. The problem is made even more severe with stereo records where the stylus is subjected to forces in two different directions for the different channels, and plowing affects the two channels differently.

In record-cutting mechanisms and certain complicated playing mechanisms, such as jukeboxes in which for example the turntable with the record on it is raised or lowered into playing position, radial arms have been used, that is to say arms so oriented that the stylus moves along a radius of the record. No problem is presented in machines which cut records initially because the stylus is moved radially by a fine-pitch screw which has, comparatively speaking, unlimited power. It has also been proposed to produce radial pick-up arms. One of the earliest proposals is described in Patent 1,868,304. This has double tracks with a wheeled carriage movable thereon. The mechanism is quite cumbersome and has been simplified by a more modern design described in Patent 2,935,326. In this patent the stylus is carried on a head on the end of an arm which slides in or out of a sleeve through a suitable bearing. It should be noted that when we refer to a radial phonograph pickup arm it is not the track on which the carriage moves which is along the radius of a record but the movement of the stylus itself, and the terms are used in this sense in the present specification.

No problem is presented in these patents by the stylus plowing into the side of a groove. However, another problem is presented, in some respects more serious. It is impossible to produce any carriage with solid-to-solid contact with its track that does not have a good deal of friction, in comparison to the pivoted conventional arm which turns easily and which can be readily counterbalanced. It is also a serious problem to adjust the weight with which the stylus presses on the record in the case of radial pickup arms; and extremely low weight, which is desirable for long record life and for maximum fidelity of reproduction, is difficult or impossible to obtain, and still harder to maintain as the mechanism wears. The present invention deals with an improved radial phonograph pickup arm which does not have the above drawbacks, in combination with a turntable.

Summary of the invention

Instead of a heavy wheeled carriage or a sliding rod as in Patent 2,935,326, the stylus is carried by a short counterbalanced housing which moves along an arm without touching it. In other words, there is no metal to metal contact and the problem of excessive friction or of excessive tracking weight does not arise.

Essentially there are two principal modifications of the present invention when the radial arm is associated with a turntable on which a record is placed. The turntable itself may be driven in the normal manner with conventional bearings or the turntable itself may ride on an air bearing in which case a common source of compressed air or compressed gas may serve both bearings.

As far as the pickup itself is concerned there are two general forms in one of which there is a hollow arm or cylinder on which a carriage moves provided with minute holes through which compressed air or other gas escapes in tiny jets; the hollow arm of course has closed ends. Alternatively there may be a rod, which may be solid or hollow that is supported by air emanating from a perforated sleeve which is part of a plenum chamber. The rod carries a reproducing cartridge and is appropriately counterbalanced. Surrounded by a hollow member with the compressed air introduced to it and flowing out through suitably disposed perforations, the rod can slide or rotate freely.

The latter form has a number of advantages; first there is no loss of air as occurs if there is a long hollow supporting arm on which a carriage containing the reproducing stylus moves. As this carriage is not the full length of a hollow arm there are exposed holes on either side through which air escapes. The holes are small and the consumption of air is not excessive but still there is a need for a considerably larger supply of compressed air. On the other hand when there is a hollow element surrounding a rod which slides and turns in it on an air bearing the holes for jets do not extend out on either side and therefore more efficient utilization of the compressed air or gas results. Also the modification in which there is a hollow member surrounding a rod carrying the counterbalanced head lends itself better to mounting to one side of the turntable whereas a hollow cylinder normally has to be mounted so that it extends across the turntable which presents certain complications when the present invention is used with record changers. For this reason the second modification may be considered as preferred. In either modification the carriage carrying the stylus head, whether it is the rod inside of a hollow member or a hollow cylinder surrounded by a solid carriage, does not touch the other member but floats on a very thin film of air. Of course, the clearance should be small in order not to utilize excessive amounts of compressed air. The friction is completely negligible and actually considerably less than in the case of a conventional swinging arm and, of course, since the stylus head moves directly across a radius of the record, the problem of different angles at the outside grooves of a record and the inside ones, which causes a tracking error, does not arise. The problems of friction, heavy tracking weight and the like, which have been so serious in the radial pickup arms used before which have been described above are completely eliminated. At the same time the structure is rugged, reliable and substantially incapable of binding under any ordinary use. Of course no pickup arm should ever be subjected to gross physical abuse. The present invention produces a combination of record-carrying member, such as a turntable, and radial arm which will withstand much more abuse than an ordinary swinging pickup arm and, of course, in order of magnitude more shock and abuse than would cause binding in the radial pickup arm as described above for example in Patent 2,935,326.

Although the hollow cylinder and solid carriage combination does not have all of the advantages of the other modification, it does lend itself to another function which in some cases is of considerable value. Holes can be provided in the bottom of the cylinder, directed to blow off dust that might be on records. Of course, the source of compressed air may be any suitable source such as a small blower or pump or even a tank of compressed air which is pumped up by hand.

The nature of the pickup itself can vary. Thus there may be an ordinary stylus with magnetic or piezoelectric elements to generate the initial electrical signal, or other types of transducers may be used. The pickup carrying element or carriage, in conjunction with the bearing tube, may also be used as a capacitative coupling for radio frequencies, such as the output of frequency-modulation pickups of standard design, to a receiving element on the record player itself, for example on the column which supports the arm carrying the carriage. The assembly thus constitutes a "wireless" record player.

It is also possible to incorporate electronic components, such as solid-state amplifiers and oscillators, batteries, printed circuits, and the like, into the sliding carriage, to broadcast a modulated signal to a receiver located at a suitable distance from the record player. In such cases the weight of the pickup system may be made much greater than that of a piezoelectric or magnetic pickup, since the carriage is very short and nearly all its weight is carried by the film of air. Thus, for wireless operation, the present invention has this important additional advantage.

The rod or cylinder on which the carriage moves may be supported at both ends in a manner similar to that described in Patent 1,868,304 or it may be cantilevered. In the latter case there is an additional advantage because a cantilevered moving rod, as shown in Patent 2,935,326, exerts a much greater binding friction, especially after some dust and dirt accumulate on the bearing surfaces, then does a track which is supported at both ends. In the present invention the simplicity and cheapness of cantilevered construction are not offset by increased friction, because the cylinder or rod does not move and can be rigidly and strongly supported.

The radial pickup arm of the present invention is of particular importance in record players for hi-fi systems where the advantages of the present invention in better reproduction, less wear on the records, and the like, are of most importance. However, it is perfectly possible to use the present invention in record changers, as will be mentioned in the specific description, although the advantage of improved tonal quality is usually less important, and of course the ordinary changer involves a greater risk of wear on records. Nevertheless, the present invention is usable either with record-playing turntables or changers.

Usually it is desirable in a radial pickup arm to have the track a little to the side of the center of the record, with the stylus offset so it travels along a radius on the record. This makes it possible to compensate for record unevenness, such as for example warped records, because the carriage can pivot up and down on the track. However, the invention can also be used with a track which passes directly over the center of the record with the stylus carried directly underneath. Here, however, it is usually necessary to raise the track when it is desired to change a record and this involves a more elaborate mechanism, which is ordinarily less desirable except in extremely complex mechanisms such as jukeboxes. The fact that the track may be over the center of the record, or to one side but parallel thereto, is an added flexibility of the present invention. The preferred modification with a hollow member, through which a shaft moves, also has the advantage that it can be to one side of the record, thus simplifying its use with record changers. The term "parallel to a record radius" is therefore intended to be used in the specification and in the claims to include the situation where the track is directly over the record radius as well as where it is to one side.

DESCRIPTION OF THE PREFERRED EMBODIMENTS

Figure 1:
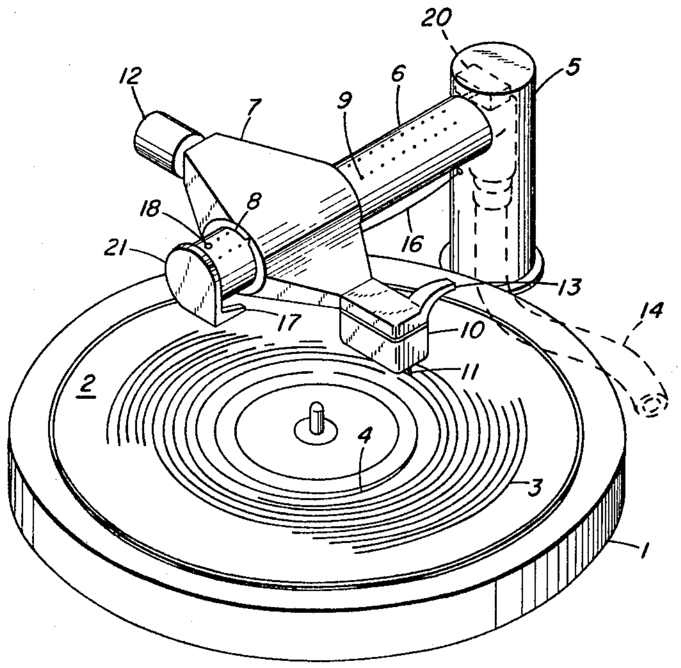
FIG. 1 is an isometric view of a turntable record and a cylinder and carriage utilizing a film of compressed gas to prevent metal-to-metal contact.

In FIG. 1 the turntable is shown at 1 with a record 2 on it, through grooves being indicated at 3, and a terminal groove at the center of the record shown at 4. A pillar 5 to one side of the turntable carries a cylinder 6 provided with lines of very fine holes 9 on the top.

On the cylinder there is a carriage 7 which fits only slightly loosely on the cylinder so that there is a very small gap 8 between the cylinder 6 and the carriage. Into this gap a film of compressed air or other gas is introduced through the holes 9, which have been referred to above, and the carriage therefore rides on a thin film of air wich is practically frictionless. The bottom of the carriage is provided with holes 19 through which a gentle current of air blows down on the record at a point on the groove just ahead of the stylus. This serves to remove dust and lint. The carriage of course is free to turn about the cylinder, and carries at one end the pickup head proper 10 with a stylus 11 and on the other end an adjustable counterbalance weight 12. A finger lift 13 is provided so that the carriage can be lifted to change records and to place the stylus in initial contact with the outer groove of the record. Compressed air is inroduced through the pillar into the cylinder through the conduit 14, which is shown in FIG. 1. A micro-switch 15 is also mounted near the end of the cylinder, the function of which will be described below.

In operation the turntable is started with a record on it, the pickup head 10 is positioned in the outer groove, and an electrical signal is produced and carried out through the pillar by means of the conventional wires 16 or by wireless transmission as described above. As the record plays, the stylus 11 follows the spiral record groove in the conventional manner, the carriage 7 sliding on its film of air. The practically frictionless movement of the carriage 7 prevents any plowing of the stylus into the side of the record groove and the minute sidewise pressure which moves the carriage along the cylinder 6 does not significantly change in different parts of the record, in marked contradistinction to the big change in friction in different parts of the record with the ordinary swinging pickup arm.

Figures 2, 3:
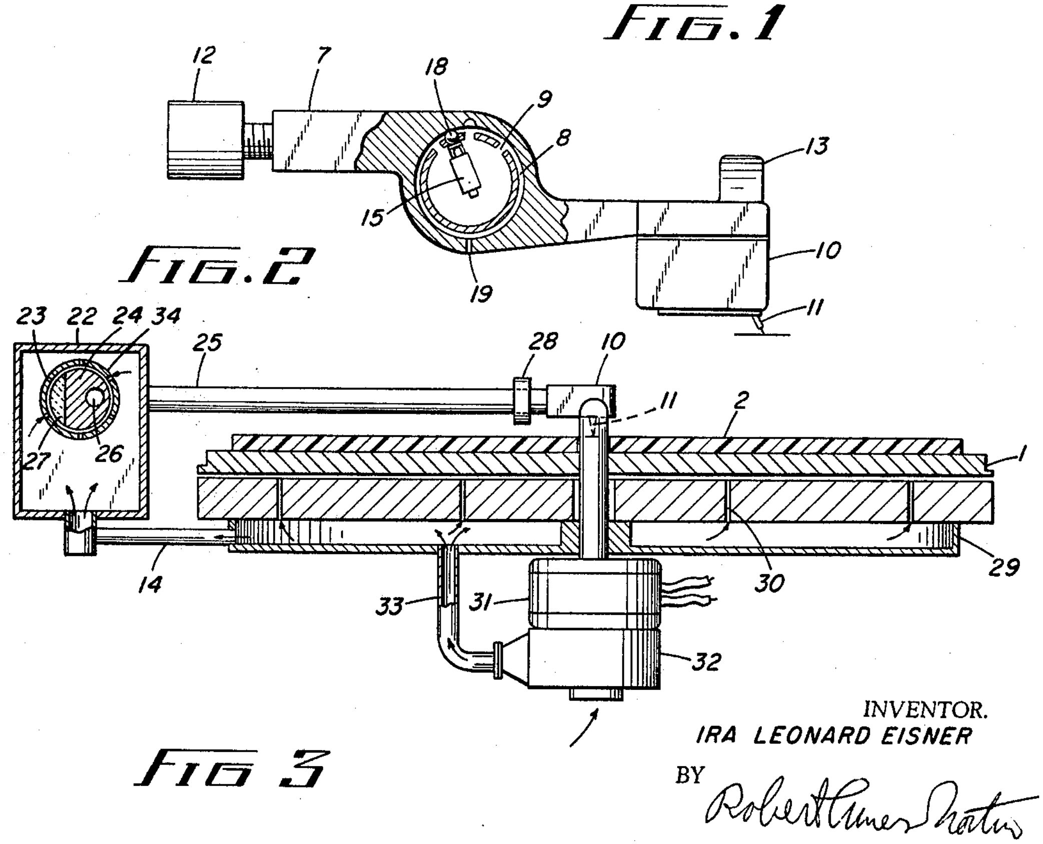
FIG. 2 is a cross-section through the carriage in FIG. 1.
FIG. 3 is a cross-section through a modification in which a hollow air chamber surrounds a sliding arm.

When the end of the record is reached, the coarse spiral 4 moves the carriage 7 in so that it contacts the inclined ramp 17 and is lifted off the record by momentum, striking the micro-switch 15 and shutting off the turntable or initiating a change cycle if the pickup arm is used on a record changer. The carriage 7 is held in this position with the head 10 elevated by a small ball 18 on the cylinder. This is best seen in FIG. 2. The carriage 7 can then be pushed or slid manually out toward the pillar 5 until it strikes a second micro-switch 20 which turns off the supply of air. The arm is illustrated primarily for a manually changed record turntable but of course the micro-switch can initiate a changing cycle in which the pillar 5 is tilted back or is swung out, the carriage being returned either by gravity in the case of tilting or by a slight impulse of a spring or bumper 21 which is compressed as the micro-switch 15 is actuated. A changer mechanism is not specifically illustrated as it is conventional, and it is an advantage of the present invention that it can be used either with a turntable or a record changer.

Figure 4:
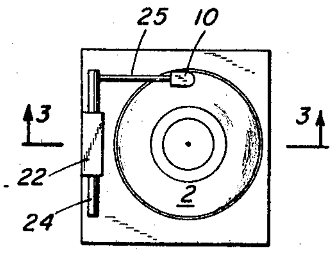
FIG. 4 is a plan view of the modification of FIG. 3.

FIGS. 3 and 4 illustrate the preferred modification referred to above, stylus and air supply receiving the same reference numerals as in FIG. 1. In this modification there is a plenum chamber 22 containing an inner sleeve 34 provided with fine openings 23. A shaft or rod 24 slides in the sleeve 34 that surrounds it. The shaft 24 is provided at its end with a head-carrying arm 25. The mechanism will be seen to be offset from the record 2 and so lends itself better to instruments which are to be used in conjunction with automatic record changers where the fact that the mechanism can be entirely clear of the record, makes changing simpler.

If the shaft 24 is solid there can be provided a longitudinal drilled hole 26 which will effect counterbalance of the weight of the head, or if the element 24 is hollow, which is preferred, a counterbalance 27 of lead may be present. Both modifications are shown in FIG. 3. Initially a small weight 28 can be moved to the point at which a particular reproducing head is counterbalanced to the desired tracking pressure.

In FIG. 3 there is also shown another modification namely an airbearing turntable 1. This turns above a hollow base 29 provided with a number of jet holes 30, only a very few of which are illustrated to avoid confusing the drawing, and through which jets of air pass to support the turning table on a thin film of air. A conventional motor 31 is shown as driving the turntable, and also a pump or blower 32 which connects through the tube 33 to the hollow base 29 which in effect acts as a plenum chamber for the compressed air flowing out of the openings 30. The connection to the element 22 surrounding the moving arm 24 is taken from the same plenum.

FIG. 1 shows a hollow cylinder with the turntable not supported by air bearings whereas FIG. 3 shows both an offset pickup arm and a turntable on air bearings. Obviously, of course, the turntable of FIG. 3 can be of conventional design without air bearing or alternatively an air bearing turntable can be incorporated in the modification shown in FIG. 1. For simplicity in illustration one alternative is shown in one figure and the other in the other.

No wires are shown in FIG. 3 carrying the signal as the head 10 is developed as a wireless transmitter. Obviously, of course, the signal can be transmitted through conventional wires in this modification shown in FIGS. 3 and 4 where the hollow member surrounds a pickup arm or shaft, or a wireless head can be used in the modification shown in FIG. 1. Essentially the design of head, whether wireless or wired, is not a part of the invention but it is an advantage of the invention that it is flexible and any type of transmission of the signal from the playback head can be used.

It will be noted that FIG. 3 shows a single blower for both air bearings on the pickup arm and on the turntable. When this combination of air bearings for both elements is used it is of course possible to use separate sources of compressed air or compressed gas for each, but in this modification there is a distinct advantage in having a single source of air as the air bearings are then fed without requiring additional compressed air elements.

It should be noted that in each of the general modifications in FIG. 1 or FIGS. 3 and 4 it is essential that the air bearing on the pickup arm permit both sliding and rotation because, unless the pickup arm can both slide and turn, the advantages of the present invention are not achieved. Air bearings which provide merely for rotation or merely for sliding are therefore practically useless in the present invention which is definitely limited to bearings in which both sliding and rotation are possible. It will be noted that in order to play a record it is only necessary that there be relative motion between the playing head and the record. In most cases the simplest construction is with a rotating turntable and a pickup head which does not turn around the record but, of course, the reverse in which the record stands still and the radial arm is turned can also be used, if desired with compensation for varying centrifugal force. This is less convenient but does reduce problems of wow which sometimes result when warped records are turned on turntables. Also, the mass and/or moment of inertia of moving elements may be reached. In these respects it is easier to have a record which does not rotate.

Normal pickup arms are provided with only a single head even in the case of stereo records. However it is of course possible to have more than one head in tandem where the special type of record that this requires is available.

I claim:

1. A radial phonograph pickup arm and turntable combination including a base framework on which the turntable is rotatably mounted, comprising in combination;

(a) a playing head pickup arm of length somewhat greater than the radius of the largest record playable on the turntable, said pickup arm being joined at one end with a cylindrical arm to form a rigid whole, the two arms comprising a substantially L-shaped unit, (b) a hollow sleeve and a casing surrounding said sleeve with a sealed chamber formed therebetween, said casing and sleeve mounted on the base framework, the centerline of said sleeve oriented parallel to a diameter of the turntable and spaced beyond the periphery of the largest record playable on the turntable, (c) the hollow sleeve being dimensioned so that the cylindrical arm can slide loosely through the sleeve, and the sleeve having fine perforations for a substantial portion of its length, (d) the pickup arm having a stylus and pickup at the end opposite the joined end, said stylus movable along said diameter as the cylindrical arm slides through said sleeve, (e) means for supplying a compressed gas to the chamber whereby the gas flows from the chamber through the fine perforations, forming a thin film of flowing gas along the cylindrical arm and leaving at the ends of the sleeve, thus forming an air bearing, and (f) the cylindrical arm of the L-shaped unit being sufficiently long so that the perforations of the hollow sleeve are not directly exposed to the atmosphere when the playing head of the pickup arm moves to the periphery of the largest record playable on the turntable.

2. A combination according to claim 1 in which the compressed gas is compressed air and the combination is provided with a power driven, air compressing means.

3. A phonograph combination according to claim 1 in which the record turntable is carried on a gaseous gap and compressed gas is supplied to form said gap and to the chamber surrounding the sleeve from the same source of compressed gas.

4. A combination according to claim 3 in which the compressed gas is compressed air and the combination is provided with a power driven, air compressing means.

References Cited

UNITED STATES PATENTS

| | | | |
|---|---|---|---|
| 3,390,886 | 7/1968 | Rabinow | 274—23 |
| 3,313,548 | 4/1967 | Moore et al. | 274—47 |
| 3,254,897 | 6/1966 | Holmes | 274—23 |
| 3,249,361 | 5/1966 | Rabinow | 274—23 |
| 3,103,364 | 7/1963 | Macks et al. | 274—39 |
| 2,684,272 | 7/1954 | Annen | 308—9 |
| 2,219,230 | 10/1940 | Krause | 274—2 |

LEONARD FORMAN, Primary Examiner

ROGER A. FIELDS, Assistant Examiner